US006557755B1

(12) United States Patent
Pickering, Jr. et al.

(10) Patent No.: US 6,557,755 B1
(45) Date of Patent: May 6, 2003

(54) METHODS AND SYSTEMS FOR TRACKING AND CONTROLLING MAILPIECE PROCESSING USING POSTAL SERVICE MAILPIECE CODE

(75) Inventors: William V. Pickering, Jr., Raleigh, NC (US); Edward J. Kapturowski, Apex, NC (US); Mark G. Paul, Raleigh, NC (US); Steven John Krejcik, Brookfield, IL (US)

(73) Assignee: Bell & Howell Mail and Messaging Technologies Company, Durham, NC (US)

( * ) Notice: Subject to any disclaimer, the term of this patent is extended or adjusted under 35 U.S.C. 154(b) by 145 days.

(21) Appl. No.: 09/636,175

(22) Filed: Aug. 10, 2000

(51) Int. Cl.[7] .................................................. G06F 7/00
(52) U.S. Cl. ....................................................... 235/376
(58) Field of Search ................................ 235/376, 383, 235/385, 492, 462.01, 462.02, 462.07; 705/28, 406; 700/109, 220, 221, 213, 225, 226

(56) References Cited

U.S. PATENT DOCUMENTS 4,822,986 A 4/1989 Guthmueller et al.
5,319,562 A * 6/1994 Whitehouse
5,420,403 A * 5/1995 Allum et al.
5,610,995 A * 3/1997 Zheng et al.
5,862,243 A * 1/1999 Baker et al.
5,867,586 A 2/1999 Liang
5,889,269 A 3/1999 Bridgelall et al.
6,176,428 B1 1/2001 Joseph et al.
6,266,575 B1 7/2001 Anderson, Jr. et al.

OTHER PUBLICATIONS

Experian, "Experian Postal Information Network Plus Precision Electronic Tracking Tools for Marketers," (publications date unknown), "month & year missing".
United States Postal Service, "Confirm Using Planet Code," (publication date unknown), "month & year missing".

* cited by examiner

*Primary Examiner*—Diane I. Lee
(74) *Attorney, Agent, or Firm*—McDermott, Will & Emery

(57) ABSTRACT

Methods and systems for tracking and controlling mailpiece processing utilize one or more postal service mailpiece codes. The postal service mailpiece codes can include a United States Postal Service POSTNET code and a PLANET code. Using the same code or codes for mailpiece processing that the postal service uses to track mailpieces in a mail stream simplifies reader design and decreases the number of codes required to be printed on a mailpiece. In addition, the number of different types of readers for reading the codes is reduced.

71 Claims, 9 Drawing Sheets

500

| POSTNET CODE (502) | PLANET CODE (504) | DATABASE INDEX (506) |
|---|---|---|
| 85072225252 | 21040362003 | 1 |
| 85072225252 | 21040572389 | 2 |
| 85072225252 | 21040578772 | 3 |
| • | • | • |
| • | • | • |
| • | • | • |
| 12345678910 | 11121314151 | n |

*FIG. 5*

METHODS AND SYSTEMS FOR TRACKING AND CONTROLLING MAILPIECE PROCESSING USING POSTAL SERVICE MAILPIECE CODE

TECHNICAL FIELD

The present invention relates to methods and systems for tracking and controlling mailpiece processing. More particularly, the present invention relates to methods and systems for tracking and controlling mailpiece processing using one or more postal service mailpiece codes.

BACKGROUND ART

In conventional mailpiece processing, a mailpiece includes multiple bar codes to control mailpiece inserting and sorting operations, as well as additional bar codes for mailpiece tracking once the mailpiece enters the mail stream. As used herein, the phrase "mail stream" refers to the path traversed by a mailpiece from the mailpiece origination address to the destination address. As used herein, the phrase "mailpiece processing" refers to operations performed on a mailpiece, such as sorting and inserting, before the mailpiece enters the mail stream.

Using multiple bar codes on a mailpiece for mailpiece processing and additional bar codes for mailpiece delivery and tracking in the mail stream presents a variety of problems as known to those of skill in the art. For example, using different bar code symbologies requires different readers. In addition, because the bar codes encode data according to different standards, each reader must have hardware and software that is tailored to decode the bar code according to the given standard. Requiring different readers and bar codes increases the expense of conventional mailpiece processing and tracking operations. Another problem with using multiple bar codes on a mailpiece to control mailpiece processing and mail stream tracking operations is that such bar codes make the mailpiece less aesthetically pleasing and reduce the amount of room for other information.

FIG. 1 of the drawings illustrates an example of a conventional mailpiece. In FIG. 1, mailpiece 100 includes bar codes 102 and/or 104 to control mailpiece processing operations. For example, bar codes 102 and/or 104 can be used to look up mailpiece inserting and sorting information in a database to control mail inserters and mail sorters. In addition, mailpiece 100 can also include codes 106 and 108 that are used for mailpiece delivery and tracking. For example, bar code 106 can be a United States Postal Service PLANET code used by the United States Postal Service to track mail electronically once the mail enters the mail stream. Similarly, code 108 can be a United States Postal Service POSTNET code that is also used by the United States Postal Service to control delivery of mailpiece in the mail stream. Finally, code 110 can be used by a mailer to perform inserter sequence verification integrity tracking.

Thus, as illustrated by mailpiece 100, a single mailpiece can include multiple bar codes that store different information for performing different functions. In addition, because the bar codes are of varying format, different types of readers and interpretation hardware and software can be required. For example, bar code 102 and/or 104 is of the Code 39 format, which requires a Code 39 reader. Bar code 104 is of the DataMatrix format, which requires a DataMatrix reader. Bar code 106 is of the PLANET code format which requires a PLANET code configured reader. Finally, bar code 110 is in character format, which requires optical an character recognition (OCR) configured reader.

Another problem associated with conventional mailpiece processing and tracking is that there are no standards as to where many of the bar codes should be located on a mailpiece. Thus, a mailpiece processing bar code may not appear in the same location on different groups of mailpieces. As a result, the orientation of code readers may require alteration from one mailpiece processing job to the next. This lack of uniformity in code placement can undesirably increase the cost of mailpiece processing.

As illustrated in FIG. 1, using a variety of bar codes on a mailpiece unnecessarily complicates the mailpiece processing and tracking operations. In addition, these codes make the mailpiece less aesthetically pleasing to the recipient. Thus, there exists a need for novel methods and systems for mailpiece processing and tracking that reduce the number and variety of bar codes that are printed on a mailpiece.

DISCLOSURE OF THE INVENTION

According to one aspect, the present invention includes methods and systems for mailpiece processing and tracking using one or more postal service mailpiece codes. As used herein, the phrase "postal service mailpiece code" refers to any code or codes printed on a mailpiece used by a postal service for monitoring a mailpiece as it travels through a mail stream. For example, according to one aspect of the invention, the United States Postal Service PLANET and POSTNET codes are used to control mailpiece processing. These codes are used by the United States Postal Service to track mailpieces and to deliver origin and destination confirmation information to end users. According to another aspect of the present invention, these codes are also used to control mailpiece processing and tracking before the mailpiece enters the mail stream. Because the same code or codes are used to track a mailpiece in the mail stream and to control processing of the mailpiece before the mailpiece enters the mail stream, code reader design is simplified and the number of bar codes required to be printed on a mailpiece is reduced.

Accordingly, it is an object of the present invention to provide novel methods and systems for controlling mailpiece processing and tracking that reduces the number of codes printed on a mailpiece.

An object of the invention having been stated hereinabove, and which is achieved in whole or in part by the present invention, other objects will be evident as the description proceeds, when taken in connection with the accompanying drawings as best described hereinbelow.

BRIEF DESCRIPTION OF THE DRAWINGS

Preferred embodiments of the present invention will now be discussed with reference to the accompanying drawings of which:

FIG. 5 is a table illustrating a translation file for converting a POSTNET code and a PLANET code to a mailpiece processing database index according to an embodiment of the present invention;

DETAILED DESCRIPTION OF THE INVENTION

Figure 1:
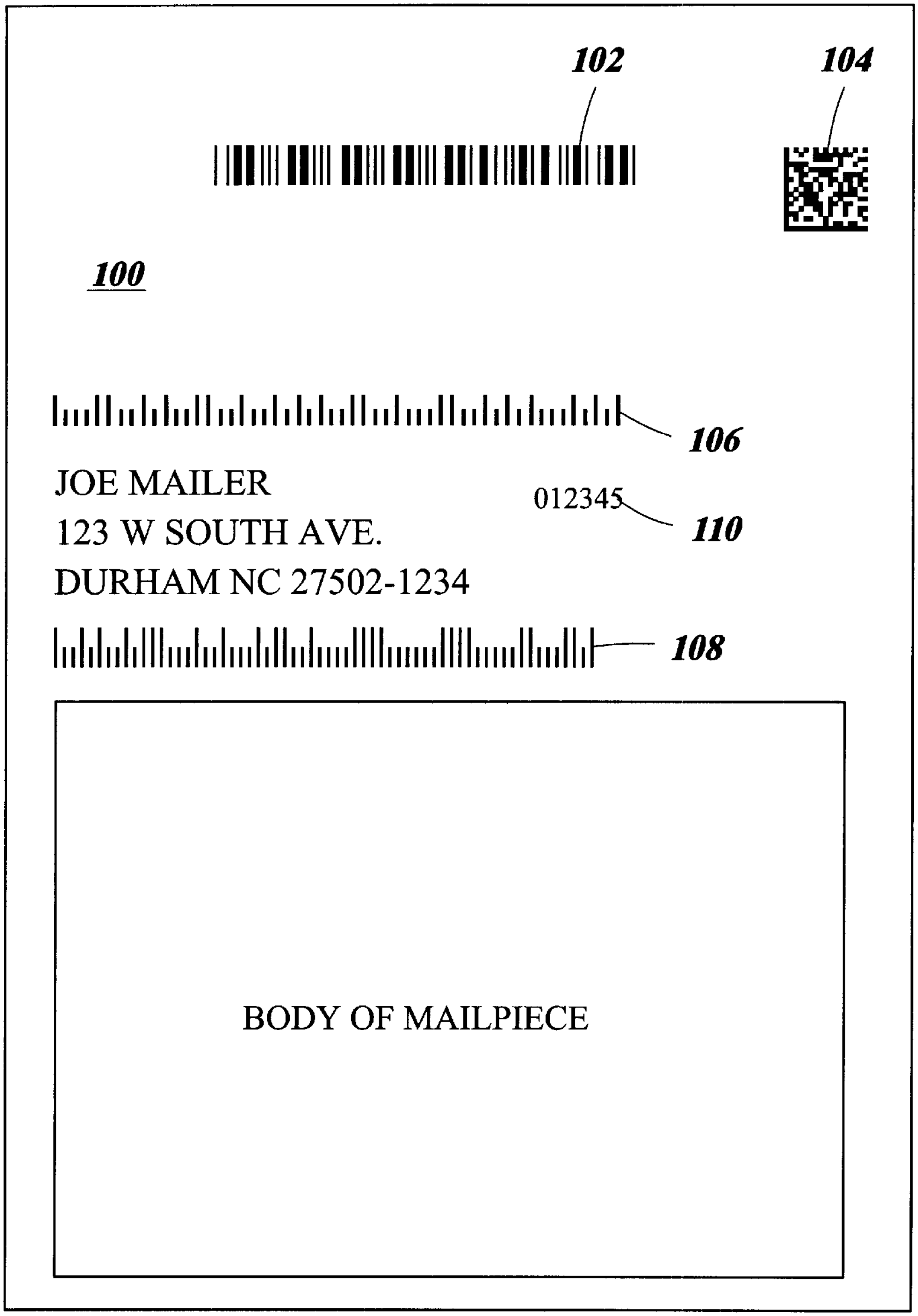
FIG. 1 (PRIOR ART)
FIG. 1 is a diagram of a prior art mailpiece including different codes in different formats for mailpiece processing and tracking.
Figure 2:
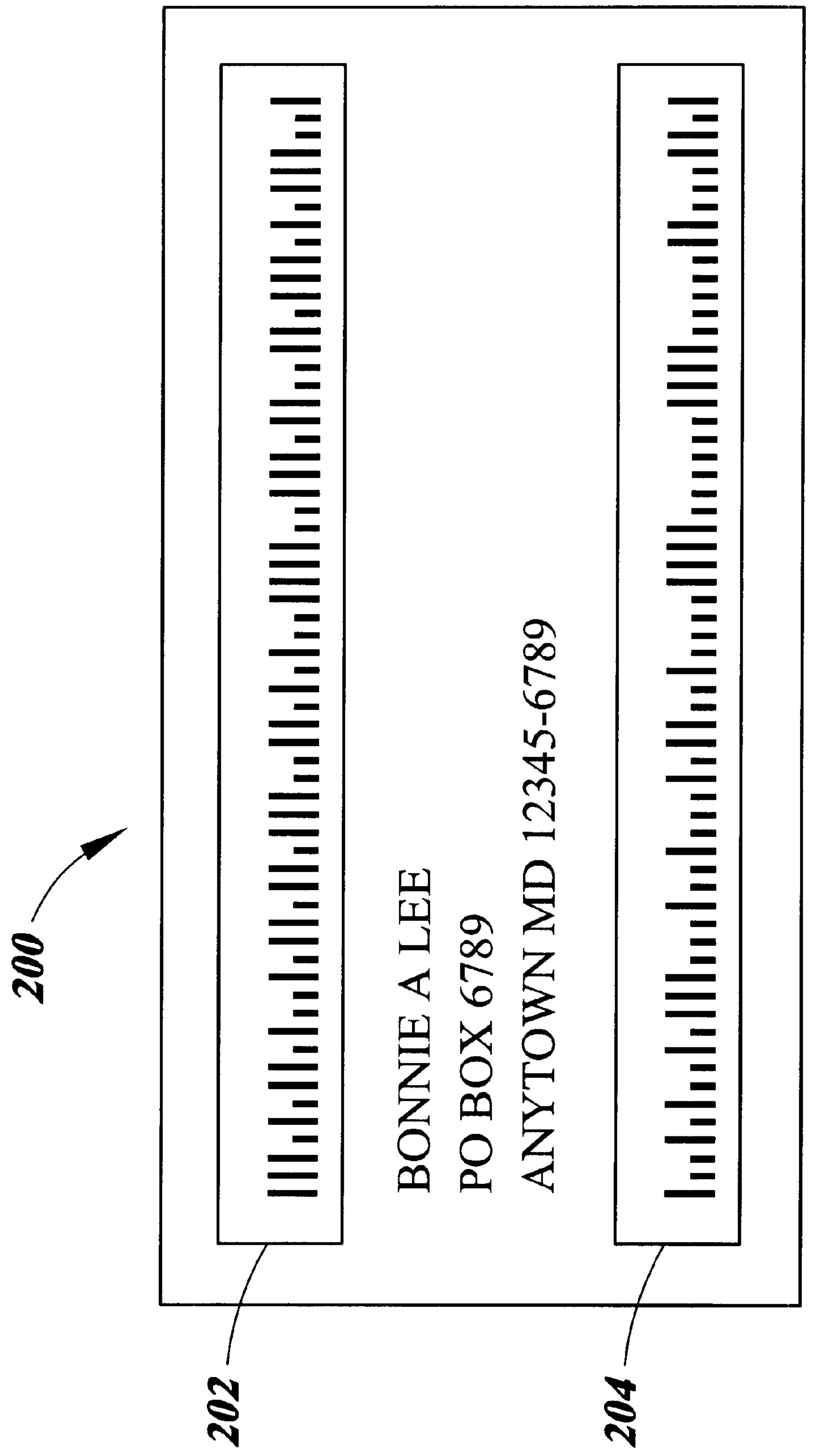
FIG. 2 is a diagram of the address block of a mailpiece illustrating an exemplary location for the POSTNET code and the PLANET code.

According to one embodiment of the present invention, one or more postal service mailpiece codes are used to control mailpiece processing before the mailpiece enters the mail stream and mailpiece tracking both before and after the mailpiece enters the mail stream. FIG. 2 illustrates exemplary postal service mailpiece codes suitable for use by embodiments of the present invention for performing these functions. In FIG. 2, reference numeral 200 generally designates the address block of a conventional mailpiece. Such an address block can either be printed on the outside of an envelope or on a mailpiece inserted in an envelope such that address block 200 is visible through a window in the envelope. Address block 200 includes United States Postal Service PLANET code 202 and POSTNET code 204. PLANET code 202 is a bar code in which bars of varying height are used to encode any suitable information, such as a service type, a customer ID or mailing and subscriber ID and a checksum. The first two digits of the PLANET code typically indicate a desired service type. For example, according to current United States Postal Service standards, the digits 21 indicate origin CONFIRM, 22 indicates destination CONFIRM, and 28 indicates both origin CONFIRM and destination CONFIRM.

Origin CONFIRM is a service offered by the United States Postal Service that allows a mailer to access data regarding when a return mailpiece has been sent. The mainstream sortation equipment scans the mail as part of sorting and routing the mail throughout the U.S. allows a customer to access information regarding when a return mailpiece has been mailed. Each time the mailpiece is scanned for the sortation process the information is recorded in the USPS confirm server. The mailer then has access to the data (multiple instances of) located on the USPS confirm server. For example, the United States Postal Service can provide code readers that read POSTNET and PLANET codes from mailpieces at various locations in the mail stream. For example, these readers are located at postal service mail sorting sites. These readers can be in communication with the United States Postal Service CONFIRM server, which logs into the confirm server database the date, time and location when a particular mailpiece passes through the multiple postal service mail delivery stream scan point locations. Thus, the origin CONFIRM service can be used to verify that a communication has been remitted by a customer.

Destination CONFIRM is a service offered by the United States Postal Service whereby a mailer can access the confirm database to access the date, time and scan point of the mailpiece being routed to the customer. The mailer can get access to the time the mailpiece was delivered to the carrier for delivery to the customer. As with the origin CONFIRM service, the destination CONFIRM service can be implemented by the Postal Service using the same readers described above and a server to communicate destination confirmation information to the mailer.

The POSTNET code, like the PLANET code, uses a height modulated symbology. The POSTNET code encodes destination information, such as the postal delivery code. The POSTNET code is used in combination with the PLANET code in the above-described origin and destination CONFIRM operations.

Although in FIG. 2 PLANET code 202 is located above the address information and POSTNET code 204 is located below the address information, the present invention is not limited to using the codes only in these locations. For example, in an alternative configuration, POSTNET code 204 can be located above the address information and PLANET code 202 can be located below the address information. The present invention can be configured to use these codes to perform mailpiece tracking and to control mailpiece processing regardless of where the codes are located on a mailpiece.

According to the present invention, postal service mailpiece codes, such as the POSTNET code and the PLANET code are used to control mailpiece processing before a mailpiece enters the mail stream and mailpiece tracking and after the mailpiece enters the outgoing and incoming mail streams. However, the present invention is not limited to using United States Postal Service POSTNET and PLANET codes to perform these functions. Controlling mailpiece processing and tracking using any code used by a postal service to monitor, track, or deliver mailpieces in the mail stream is within the scope of the invention. For example, the Canadian Post Corporation uses a Code 39 symbology to control mailpiece processing in its mail stream. This symbology can be used either alone or in combination with other codes to control mailpiece processing and tracking according to an embodiment of the present invention. All that is required of a code for purposes of the present invention is that the code, either alone or in combination with other codes, uniquely identify a mailpiece.

Figure 3:
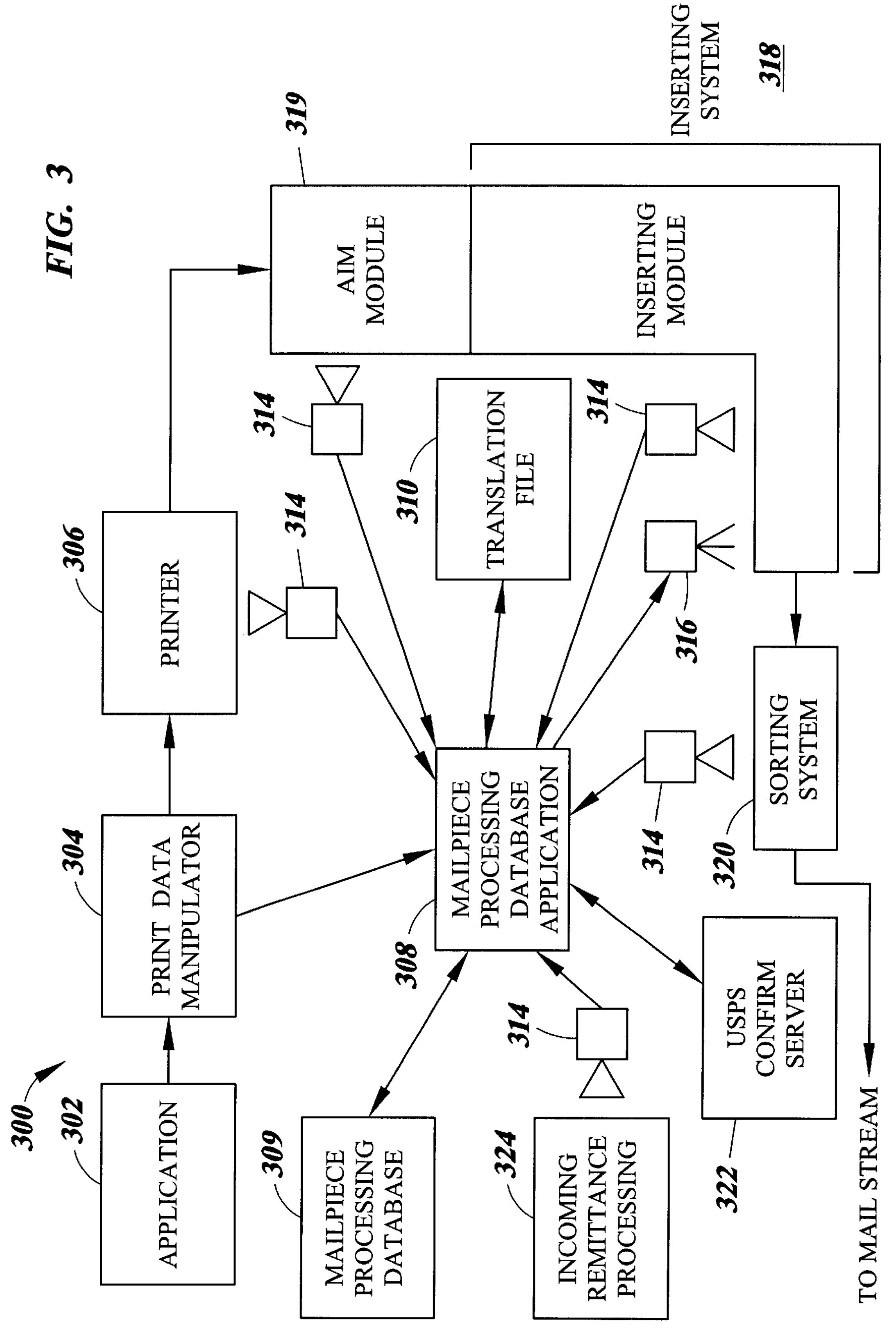
FIG. 3 is a block diagram illustrating a system for mailpiece processing and tracking using a postal service mailpiece code according to an embodiment of the present invention.

FIG. 3 illustrates a system for controlling mailpiece processing and tracking using a postal service mailpiece code according to an embodiment of the present invention. In FIG. 3, a mailpiece processing tracking system, generally designated 300, includes components that create a mailpiece to be placed in a mail stream. For example, system 300 includes an application 302 that generates print data to be printed on a mailpiece. Such an application can be a computer program executing on a general purpose computer that generates the mailpiece print data. Such mailpiece data can include the actual information content of a mailpiece. For example, if the mailpiece is a bill, the print data can include the address of the recipient of the bill and the amount of the bill.

Print data manipulator 304 receives the print data from application 302. Like application 302, print data manipulator 304 can be a program executing on a general purpose computer. An example of a print data manipulator program suitable for use with the present invention is a statement parameter group written using TRANSFORMER® commercially available from Bell and Howell Mail and Messaging Technologies Company of Durham, N.C. In response to receiving the print data, print data manipulator 304 can reformat and add additional print data, such as the PLANET code and POSTNET code, and deliver pertinent information to printer 306 and mailpiece processing database application 308. Mailpiece processing database application 308 stores the information received from print data manipulator 304 in a mailpiece processing database 309. Mailpiece processing database application 308 can be a computer program executing on a general purpose computer. An example of a computer program suitable for use as mailpiece processing database application is INTELLASERT™ commercially available from Bell and Howell Mail and Messaging Technologies Company of Durham, N.C. INTELLASERT™ is adapted to extract mailpiece processing information from a mailpiece processing database and deliver the information to appropriate mailpiece processing devices, such as inserters and sorters. While in the prior art, mailpiece processing databases are typically indexed using database-application-specific sequential parameters, according to the present embodiment, mailpiece processing database application 308 is adapted to access mailpiece processing data in database 309 based on one or more postal service mailpiece codes.

The mailpiece processing information stored in database 309 can include instructions for inserting, sorting, and printing the mailpiece. In addition, the database may include blank fields for storing one or more instances of mailpiece tracking data. Table 1 shown below is an example of a mailpiece processing database entry for a single mailpiece. In the table, the entry includes a plurality of fields, and each field has a group of associated records. Of particular interest to embodiments of the present invention are field number 2, document ID; field number 70, delivery point bar code or POSTNET code; 78–79, which relate to PLANET code origin and destination confirm; and 80–87, which relate to mailpiece tracking. Because fields 80–87 may be updated as a mailpiece travels through the mail stream, fields 80–87 may have multiple instances for each mailpiece in the mailpiece processing database. Each of these fields will be discussed in more detail below with regard to mailpiece processing and tracking using the POSTNET and PLANET codes.

TABLE 1

Mailpiece Processing Database Entry

| Field Number | Field Name | Mailpiece Record 1 | Mailpiece Record | Mailpiece Record N |
|---|---|---|---|---|
| 1 | Dataset Name | | | |
| 2 | Document ID | | | |
| 3 | Total Sheets | | | |
| 4 | Stream 1 Units | | | |
| 5 | Stream 2 Units | | | |
| 6 | Stream 3 Units | | | |
| 7 | Stream 4 Units | | | |
| 8 | Target Destination | | | |
| 9 | Final Destination | | | |
| 10 | Mail Year | | | |
| 11 | Mail Month | | | |
| 12 | Mail Day | | | |
| 13 | Finish Time | | | |
| 14 | Finish Year | | | |
| 15 | Finish Month | | | |
| 16 | Finish Day | | | |
| 17 | Inserter Name | | | |
| 18 | Inserter Type | | | |
| 19 | Shift Number | | | |
| 20 | Job Seq Num | | | |
| 21 | Operator One | | | |
| 22 | Weight Actual | | | |
| 23 | Postage | | | |
| 24 | Pull Key | | | |
| 25 | Tray Check Mask | | | |
| 26 | Clear Inserter | | | |
| 27 | Dupe Count | | | |
| 29 | Unused | | | |
| 30 | Destination Reason | | | |
| 31 | Staple | | | |
| 32 | Envelope Seal | | | |
| 33 | Security Seal | | | |
| 34 | Envelope Paint 1 | | | |
| 35 | Call Insert Code 1 | | | |
| 36 | Verify String 1 | | | |
| 37–54 | Call Insert and Verify String | | | |
| 55 | Call Insert Code 16 | | | |
| 56 | Verify String 16 | | | |
| 57 | Host Sort ID | | | |
| 58 | Manifest Type | | | |
| 59 | Tray Number | | | |
| 60 | Tray Size | | | |
| 61 | Tray Sort Level | | | |
| 62 | Tray Destination | | | |
| 63 | Group Destination | | | |
| 64 | Mailpiece Seq Number | | | |
| 65 | Print Manifest Number | | | |
| 66 | Tray Label Destination | | | |
| 67 | Tray Label Contents | | | |
| 68 | Tray Label Source | | | |
| 69 | User Field | | | |
| 70 | Delivery Point Bar Code | | | |
| 71 | Host Keyline | | | |
| 72 | Print Line 01 | | | |
| 73 | Print Line 02 | | | |
| 74 | Print Line 03 | | | |
| 75 | Print Line 04 | | | |
| 76 | Print Line 05 | | | |
| 77 | Print Line 06 | | | |
| 78 | Planet Code Destination Confirm Barcode | | | |
| 79 | Planet Code Origin Confirm Bar Code | | | |
| 80 | USPS Destination Conf - SCF Number | | | |
| 81 | USPS Destination Conf - Op Code | | | |
| 82 | USPS Destination Conf - Scan Date | | | |
| 83 | USPS Destination Conf - Scan Time | | | |
| 84 | USPS Origin Conf - SCF Number | | | |
| 85 | USPS Origin Conf - Op Code | | | |
| 86 | USPS Origin Conf - Scan Date | | | |
| 87 | USPS Origin Conf - Scan Time | | | |
| 88 | Period | | | |
| 89 | CR - Carriage Return | | | |
| 90 | LF - Line Feed | | | |

The data stored in mailpiece processing database 309 can be used to control any suitable mail processing device or devices, such as inserting system 318 and sorter 320. In the illustrated example, inserting system 318 includes an inserting module, a stuffing section, and a delivery section. Inserting system 318 is responsible for inserting the correct materials in the correct envelopes. For example, mail to be delivered to a football fan may include one set of promotional inserts while mail to be delivered to a baseball fan may include another set. Because individual mailpieces can be uniquely identified using POSTNET and PLANET codes, and processing information can be extracted from database 309, the correct inserts can be paired with each mailpiece. Such operations are referred to as selective insertion and can be controlled using the POSTNET and PLANET codes to extract the selective insertion instructions from database 309. Other inserting operations for which instructions can be extracted using the POSTNET and PLANET codes include envelope printing, such as addressing destination control, and post-stuffing processing, such as special handling. For example, it may be desirable to extract some mailpieces from processing when mailing of these pieces is no longer desirable. Such a situation can occur if the mailpiece is a bill and the mailer receives payment. AIM® module 319 controls input of material to inserting system 318 based on control information extracted from mailpiece processing database 309. For example, AIM® module 319 may include a sheet feeder or cutter, an accumulator, and a folder, all of which can be controlled by mailpiece processing instructions extracted from database 309 based on the POSTNET and PLANET codes. Exemplary operations of AIM® module 319 are described in detail in U.S. Pat. No. 4,223,882, the disclosure of which is incorporated herein by reference in its entirety.

The present invention is not limited to extracting mailpiece processing data for controlling an inserter configured like inserting system 318 illustrated in FIG. 3. Extracting mailpiece processing information from a mailpiece processing database for controlling any suitable mailpiece processing device is intended to be within the scope of the invention.

Figure 4:
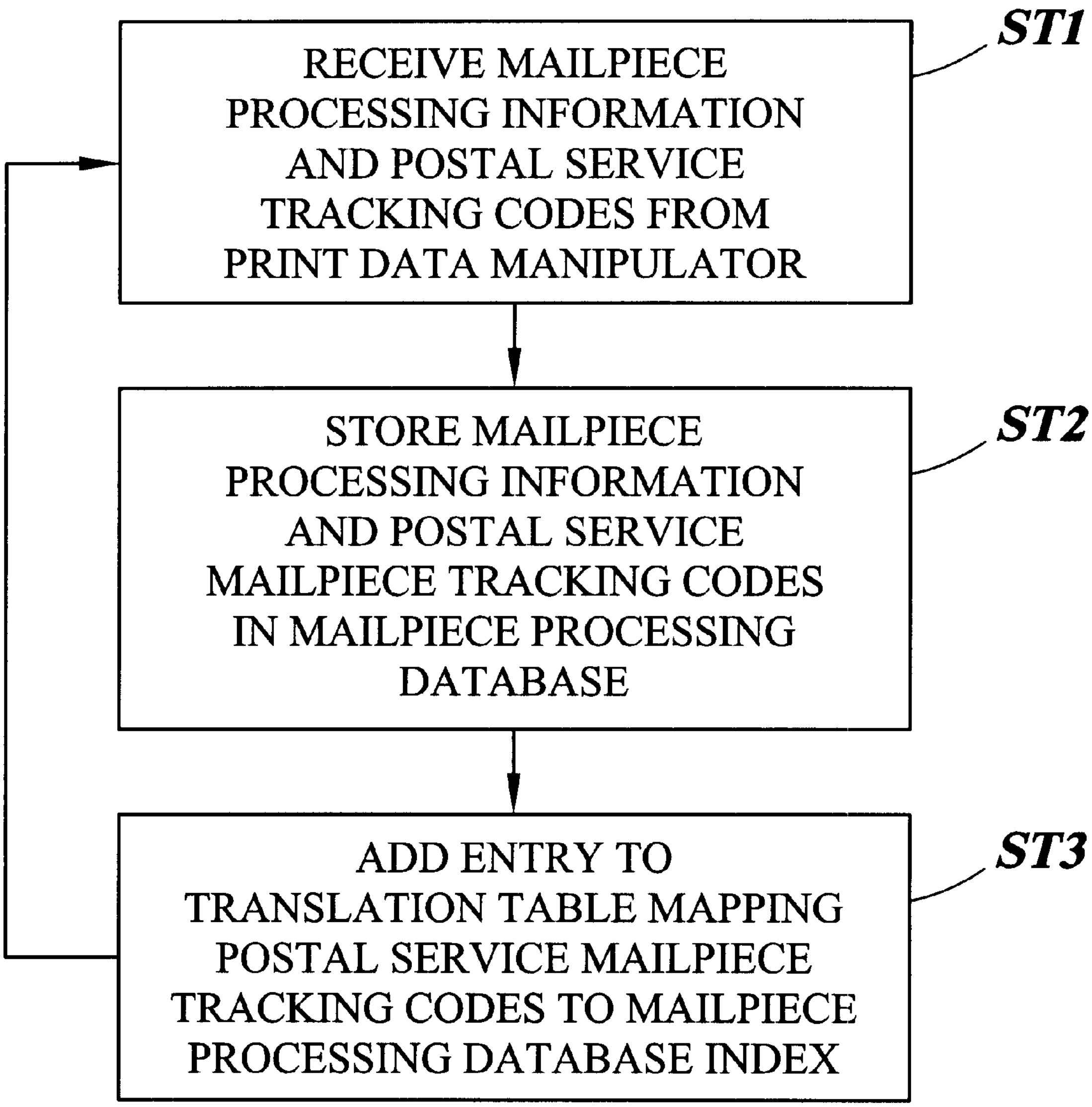
FIG. 4 is a flowchart illustrating exemplary steps that can be performed by a mailpiece processing database application in generating an index to a mailpiece processing database using a postal service mailpiece code according to an embodiment of the present invention.

According to one embodiment of the invention, mailpiece processing database application 308 generates a translation file 310 based on the PLANET code and POSTNET code for extracting translation information from mailpiece processing database 309. FIG. 4 is a flowchart illustrating exemplary steps that can be performed by mailpiece processing database application 308 in generating the translation file 310. Referring to FIG. 4, in step ST1, mailpiece processing application 308 receives mailpiece processing information and postal service tracking codes from print data manipulator 304. Such mailpiece processing information can include information destined for any of the fields illustrated in Table 1. The postal service mailpiece codes can include a POSTNET code, a PLANET code, or any other code used by a postal service to track a mailpiece in the mail stream that can be used alone or in combination with other codes to uniquely identify a mailpiece. As will be discussed in more detail below, the translation file can be used for sequencing and for associating origin and destination CONFIRM information in the mailpiece processing database.

In step ST2, mailpiece processing database application 308 stores the mailpiece processing information and the postal service mailpiece code in mailpiece processing database 309. The mailpiece processing information can be stored in an entry that is accessible through an index value, which is indicated by the document ID field in Table 1. The index value can be generated by mailpiece processing database application 308 and can simply comprise a numeric or alphanumeric character or characters that uniquely identify the entry. In step ST3, mailpiece processing database application 308 adds an entry to translation file 310 that maps the postal service mailpiece code or codes to the mailpiece processing database index, i.e., the unique document ID.

FIG. 5 illustrates an example of translation file 310 according to an embodiment of the present invention. In FIG. 5, translation file generally designated 500 includes three fields. A first data field 502 stores the POSTNET code associated with a mailpiece. The second data field 504 stores the PLANET code associated with a mailpiece. Finally, a third data field 506 stores the database index to mailpiece processing database 309. Each row in Table 5 represents an entry that maps a POSTNET code/PLANET code combination to a mailpiece processing database index. It should be noted from the first column in the table illustrated in FIG. 5 that the POSTNET code alone is not unique to a given mailpiece. Similarly, although not illustrated in FIG. 5, the PLANET code is typically not unique to a given mailpiece. However, the combination of the POSTNET and PLANET codes is unique to a given mailpiece. Because translation file 500 uniquely maps POSTNET/PLANET code combinations to database indices, mailpiece processing database application 308 can use the POSTNET and PLANET codes to control mailpiece processing. This process will be described in more detail below.

Although the embodiment described with respect to FIGS. 4 and 5 includes generating a mailpiece processing database index using the POSTNET and PLANET codes, the present invention is not limited to such an embodiment. For example, the steps illustrated in FIG. 4 are optional and can be omitted in an alternative embodiment of the invention. As illustrated in Table 1, the POSTNET and PLANET codes can be stored in a mailpiece processing database entry for a mailpiece. Accordingly, these values can be used to directly index a database entry without requiring the generation of a separate index value or a translation file. However, generating a translation file can be advantageous because such generation reduces the amount of information transmitted over the mailpiece processing network and can decrease the time for locating the mailpiece processing data in mailpiece processing database 309. Accordingly, the present invention includes both directly indexing mailpiece processing database 309 using the POSTNET and PLANET codes or generating a translation file based on these codes to index mailpiece processing database 309.

Referring back to FIG. 4, once mailpiece processing database application 308 adds an entry to the translation table in translation file 310, control returns to step ST1 where mailpiece processing application 308 receives mailpiece processing information for the next mailpiece. The steps of storing the mailpiece processing information in database 309 and adding an entry to translation file 310 are repeated for the next mailpiece. The POSTNET and PLANET codes are stored in both mailpiece processing database 309 and translation file 310. Thus, mailpiece processing application 308 creates a data structure, namely translation file 310, that facilitates both mailpiece processing and tracking.

Figure 6:
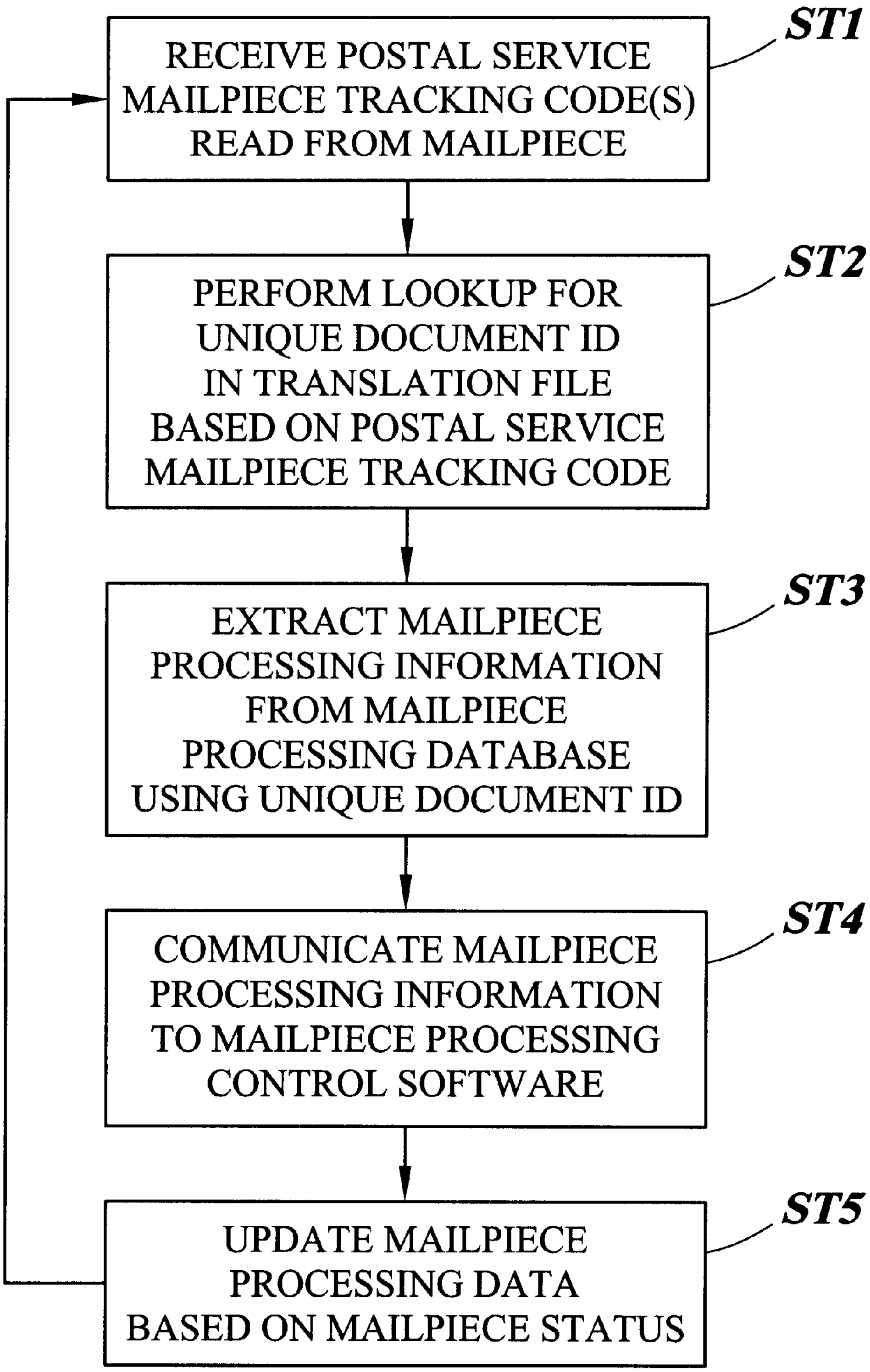
FIG. 6 is a flowchart illustrating exemplary steps that can be performed by a mailpiece processing database application in locating and updating mailpiece processing information using a postal service mailpiece code according to an embodiment of the present invention.

Accessing Mailpiece Processing Control Information Using POSTNET and PLANET Codes Once the mail processing information is stored in mailpiece processing database 309, the POSTNET and PLANET codes can be used to access control information used in mailpiece processing. This feature is used primarily for outgoing mail, e.g., where an inserter is creating a mailpiece to be sent to a customer. FIG. 6 is a flowchart illustrating exemplary steps that can be performed by mailpiece processing database application 308 in locating mailpiece processing using a postal service mailpiece code and communicating the information to mailpiece processing control software. The mailpiece processing control software can be software associated with an inserter, a sorter, or other suitable mailpiece processing devices. Referring to FIG. 6, in step ST1, the mailpiece processing database application receives postal service mailpiece codes read from a mailpiece. For example, as illustrated in FIG. 3, readers 314 located at various locations in the mailpiece processing system can read the postal service mailpiece codes from mailpieces being processed. Readers 314 communicate this information to mailpiece processing database application 308. The readers are typically located in the input device (AIM® 319) of inserter 318 to read the first sheet of the control document, i.e., the document in a set of documents that includes the POSTNET and PLANET codes.

Although readers 314 are shown in FIG. 3 as being external to mailpiece processing equipment, the present invention is not limited to such an embodiment. For example, inserter 318 and sorter 320 can include internal readers integrated into the control system of inserter 318 that read the POSTNET and PLANET codes from mailpieces that communicate these codes to mailpiece processing database application 308.

Returning to FIG. 6, in step ST2, mailpiece processing database application 308 performs a lookup for a unique document identifier in translation file 310 based on the postal service mailpiece codes. In step ST3, mailpiece processing database application 308 extracts mailpiece processing information from mailpiece processing database 309 using the unique document ID or index obtained from translation file 310. Alternatively, as discussed above, the mailpiece processing information can be extracted from mailpiece processing database 309 directly using the POSTNET and PLANET codes, rather than the index. In step ST4, mailpiece processing database application 308 communicates the mailpiece processing information to the mailpiece processing control software associated with a machine. After the mailpiece processing control software receives the mailpiece processing information, the mailpiece processing control software performs a mailpiece processing task using the mailpiece processing control information. Examples of such mailpiece processing tasks include mailpiece sorting and mailpiece inserting. Exemplary sorting and inserting operations that may be performed include selective insertion, envelope printing, destination control, and post stuffing processing. As illustrated in FIG. 3, the data extracted from database 309 can be used to control inserter 318, sorter 320, or printer 316. Exemplary inserter functions that can be controlled based on information extracted from database 309 include set collation, insert selection, postage value determination, postage value determination, and envelope printing.

In step ST5, mailpiece processing database application 308 updates the mailpiece processing data in mailpiece processing database 309 based on the mailpiece status. Such information can include the location, date and time in the mailpiece processing stream at which the POSTNET and PLANET codes were read.

Thus, as illustrated in FIG. 6, mailpiece processing can be controlled using the POSTNET and PLANET codes. This reduces the need for additional bar codes to be included on a mailpiece. In addition, because the POSTNET and PLANET codes have a standardized format, reader design is simplified.

According to another aspect of the invention, postal service mailpiece codes can be used for tracking mailpieces both before and after the mailpieces enter the mail stream. For example, as illustrated in FIG. 3, readers 314 read the PLANET and POSTNET codes from various locations in the mailpiece processing stream. The location at which the codes are read can be used to update tracking information in database 309. Similarly, readers (not shown) can be located at various locations in the mail stream to track mailpieces in the mail stream based on the POSTNET and PLANET codes. The readers are typically integrated into the postal system's mail sortation and routing equipment. According to United States Postal Service standards, this mailpiece tracking information can be stored on a server, referred to as a CONFIRM server and accessed using a standard file transfer protocol, such as FTP. Accordingly, mailpiece processing database application 308 illustrated in FIG. 3 can communicate with United States Postal Service CONFIRM server 322 to obtain mailpiece tracking information from the mail stream. Yet another source of mailpiece tracking information is incoming remittance processing 324. This portion of a mailpiece processing operation receives incoming mail from customers. A reader 314 can be positioned near the incoming remittance processing equipment to read the POSTNET and PLANET codes from incoming mail. Mailpiece processing database application 308 can use this information to update database records regarding a mailpiece, such as records used to track payment of invoices.

Mailpiece Tracking Using POSTNET and PLANET Codes

Figure 7:
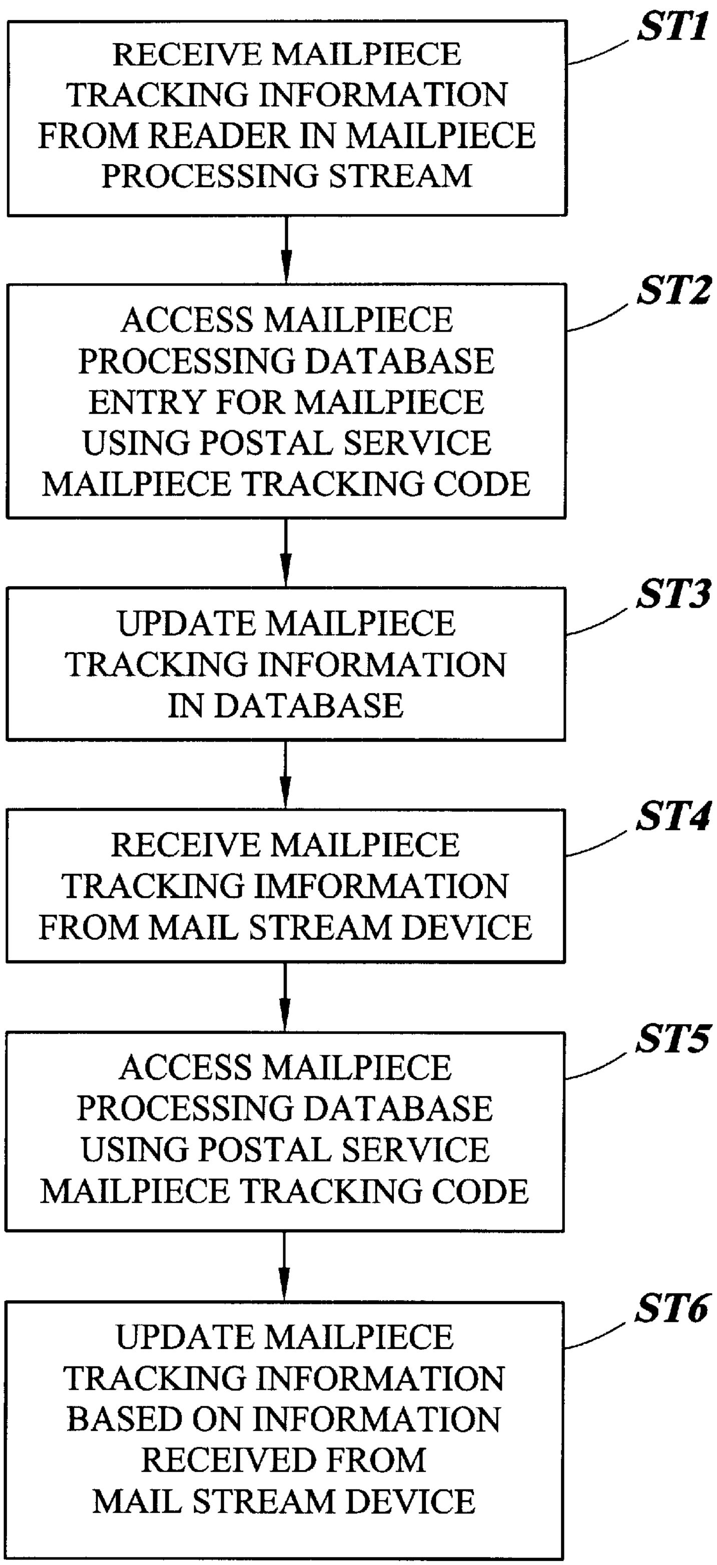
FIG. 7 is a flowchart illustrating exemplary steps that can be performed by a mailpiece processing database application in tracking a mailpiece both before and after the mailpiece enters the mail stream using a postal service mailpiece code according to an embodiment of the present invention.

FIG. 7 illustrates exemplary steps that can be performed by mailpiece processing database application 308 in updating mailpiece tracking information using the POSTNET and PLANET codes. Referring to FIG. 7, in step ST1, mailpiece processing database application 308 receives mailpiece codes from a reader in the mailpiece processing stream. The reader can be an external reader, such as one of the readers 314 illustrated in FIG. 3 or a reader internal to a mail processing machine, such as an inserter or a sorter. The mailpiece tracking information can include the POSTNET code and the PLANET code or any other code that uniquely identifies the mailpiece. In step ST2, mailpiece processing database application 308 accesses the mailpiece processing database entry for the mailpiece using the postal service mailpiece code or codes. As indicated above with respect to FIG. 6, the mailpiece processing database 309 can be accessed using the POSTNET and PLANET codes directly or using an index generated from the POSTNET and PLANET codes. In step ST3, mailpiece processing database application 308 updates the mailpiece tracking information in the database. As stated above, such information can include the location, date and time at which the codes were read in the mailpiece processing stream.

In step ST4, mailpiece processing database application 308 receives mailpiece tracking information from a mail stream device, such as a United States Postal Service CONFIRM server. In step ST5, mailpiece processing database application 308 accesses mailpiece processing database 309 based on the postal service mailpiece code. In step ST6, mailpiece processing database application 308 updates the mailpiece tracking information based on the information based on the information received from the mail stream.

Finally, tracking information regarding response mailpieces can be tracked by reading the POSTNET and PLANET codes of mailpieces received by remittance processing equipment 324 illustrated in FIG. 3.

Thus, as illustrated in FIG. 7, mailpiece tracking can be performed during the entire life of a mailpiece, i.e., both before the mailpiece enters the mail stream and throughout the outgoing and incoming mail stream, using a postal service tracking code. In addition, response mailpieces can be tracked by reading POSTNET and PLANET codes from incoming mail. Integrating such tracking allows a mailer to track a mailpiece during its entire life. In addition, because such tracking is done using standard bar codes already included on a mailpiece, the design of such a system is greatly simplified. Also, the same index and code can be used for the entire life of the mailpiece.

Monitoring and Controlling Mailpiece Sequencing Using POSTNET and PLANET Codes

Figure 8:
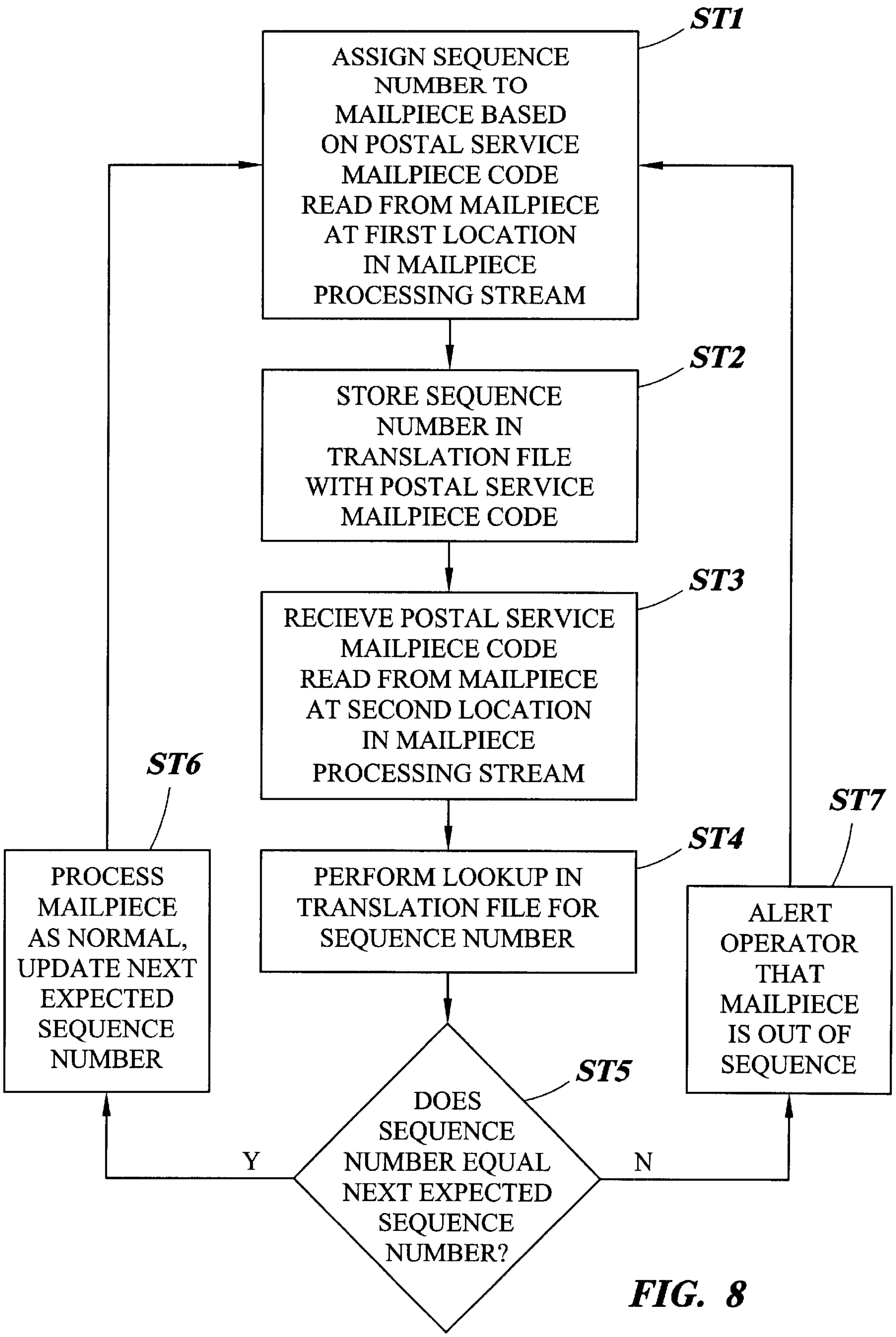
FIG. 8 is a flowchart illustrating exemplary steps that can be performed by a mailpiece processing database application in performing mailpiece sequencing using a postal service mailpiece code according to an embodiment of the present invention.

According to another aspect, the present invention includes methods and systems for performing mailpiece sequencing using POSTNET and PLANET codes. As used herein, mailpiece sequencing refers to generating a sequence number for each mailpiece during mailpiece processing and determining whether all mailpieces have been processed by verifying the sequence numbers before a mailpiece enters the mail stream. FIG. 8 illustrates exemplary steps for performing mailpiece sequencing using the POSTNET and PLANET codes according to an embodiment of the present invention. The steps illustrated in FIG. 8 may be performed by mailpiece processing database application 308 illustrated in FIG. 3 or by a separate sequencing application that is in communication with readers 314. Accordingly, although the description below will be described with respect to operations performed by mailpiece processing database application 308, it is understood that these operations could be performed by a separate process.

Referring to FIG. 8, in step ST1, mailpiece processing database application assigns a sequence number to a mailpiece based on a postal service mailpiece code read from the mailpiece at a first location in the mailpiece processing stream. The first location may be the first reader in the mailpiece processing stream that reads the codes from the mailpiece. The sequence numbers may be assigned sequentially based on the order in which the mailpiece passes the given reader. Such sequence number assignment in this example is independent from the POSTNET code and PLANET code. Thus, the first mailpiece that passes the reader may be sequence number 1, the second mailpiece may be assigned sequence number 2, etc. The sequence numbers may be same as the database indexes illustrated in FIG. 5.

In an alternative embodiment of the invention, the sequence number may be included in the PLANET code. For example, the last four digits of the PLANET code specify a customer ID according to United States Postal Service standards. These last four digits could alternatively be used to specify the sequence number. The mailpiece processing database application may assign the last four digits of the PLANET code of the first mailpiece that enters the mailpiece processing stream to be 0000. The last four digits of the PLANET code for the second mailpiece would be 0001, and so forth. Using the last four digits of the PLANET code to sequence mailpieces provides the advantage of eliminating the need for an external sequence number. However, it provides a disadvantage in that the POSTNET/PLANET code combinations may not be unique. For example, after 10,000 mailpieces are produced with the same POSTNET code, the last four digits of the PLANET code will wrap around. This potentially makes the combination of POSTNET and PLANET code non-unique. However, since it may be unlikely that 10,000 mailpieces are mailed to the same POSTNET code during a given mailing, using the last four digits of the PLANET code as a sequence number may be desirable in some instances.

In FIG. 8, it is assumed that a separate sequence number is generated for each POSTNET/PLANET code combination. Accordingly, in step ST2, the sequence number generated for the POSTNET/PLANET code combination is stored in a translation file with the corresponding codes. The translation file may be similar to or the same as the translation file in FIG. 5. In step ST3, mailpiece processing database application 308 receives a postal service mailpiece code read from a mailpiece at a second location in the mailpiece processing stream. The second location may be a reader that is located near the end of the mailpiece processing stream, such as after the sorter or after the inserter. In step ST4, mailpiece processing database application 308 performs a lookup in the translation file for the sequence number. In step ST5, mailpiece processing database application 308 determines whether the sequence number equals the next expected sequence number. In step ST6, if the sequence number equals the next expected sequence number, mailpiece processing database application 308 processes the mailpiece as normal and updates the next expected sequence number. In step ST7, if mailpiece processing database application 308 determines that the sequence number of the current mailpiece does not equal the next expected sequence number, mailpiece processing database application 308 alerts the operator that the mail is out of sequence. The operator may then take appropriate action, such as stopping the mail processing operation. Accordingly, the present invention allows sequencing based on one or more postal service mailpiece codes.

Outgoing and Return Mailpiece Tracking Using POSTNET and PLANET Codes and Mailpiece Processing Database According to another aspect, the present invention includes methods and systems for outgoing and return mailpiece tracking using the mailpiece processing database and the POSTNET and PLANET codes. As used herein, outgoing mailpiece refers to a mailpiece being sent by a mailer to a third party. An example of such a mailpiece is a bill. A return mailpiece, as used herein, is a mailpiece that is included with the outgoing mailpiece to be returned by the third party in response to the outgoing mailpiece. An example of such a mailpiece is the portion of a bill that is returned with payment for the bill. The present invention includes methods and systems for tracking both the outgoing and return mailpieces as they travel through the mail stream using the POSTNET and PLANET codes and the mailpiece processing database.

Figure 9:
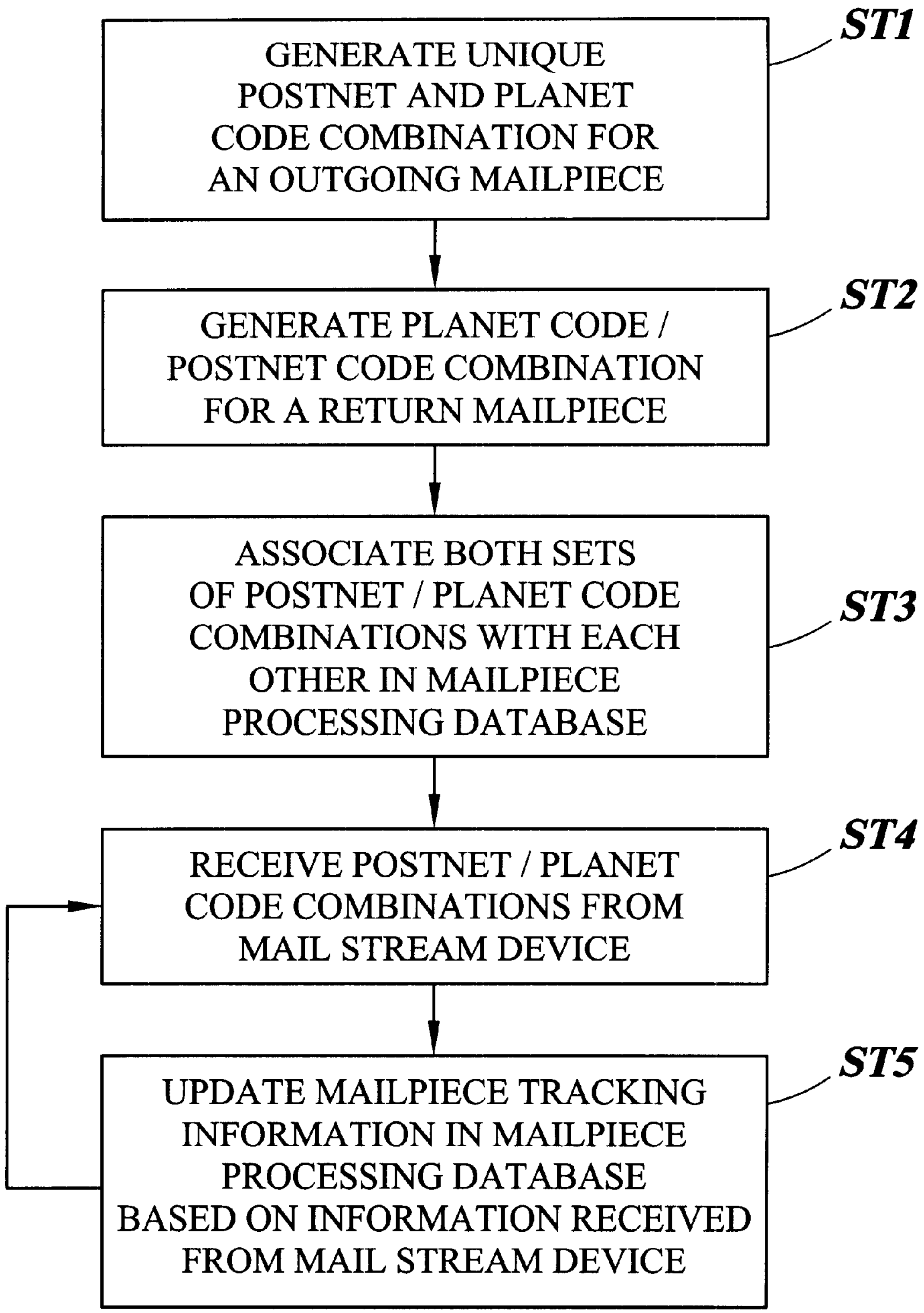
FIG. 9 is a flowchart illustrating exemplary steps that may be performed by a mailer in performing outgoing and return mailpiece tracking according to an embodiment of the present invention.

FIG. 9 illustrates exemplary steps that may be performed by a mailer in performing outgoing and return mailpiece tracking. Referring to FIG. 9, in step ST1, the mailer generates a unique POSTNET and PLANET code combination for an outgoing mailpiece. Table 1 shown below illustrates an example of such combinations that may be generated by the mailer.

TABLE 1

POSTNET and PLANET Codes for Outgoing Mailpieces

| POSTNET | PLANET | INDEX |
|---|---|---|
| 23516-1234-12 | 22-12345-0001 | 1 |
| 23516-4321-12 | 22-12345-0001 | 2 |
| 23516-4321-12 | 22-12345-0002 | 3 |
| 23516-1234-12 | 22-12345-0001 | 1 |
| 23516-4321-12 | 22-12345-0001 | 2 |
| 23516-4321-12 | 22-12345-0002 | 3 |

In Table 1, the first two digits of each PLANET code are 22, which indicate destination CONFIRM service is requested from the Postal Service. The first two PLANET codes in the table are not unique as they represent the same content of a mailpiece. The first two POSTNET codes in the table are unique, indicating different destinations for the mailpiece. In the third row of the table, the PLANET code is different from the PLANET codes in the first two rows, indicating a different mailpiece. The POSTNET code in the third row of the table is the same as the POSTNET code in the second row of the table, indicating that the mailpiece will be delivered to the same destination as the mailpiece specified in the second row of the table. Table 1 also includes indices for each combination of POSTNET and PLANET codes. As discussed above, such indices may be stored in a translation file. Alternatively, the indices can be omitted and the POSTNET/PLANET code combination can be used directly to search the mailpiece processing database.

In addition to creating unique POSTNET/PLANET code combinations for outgoing mail, the mailer preferably also generates unique POSTNET/PLANET code combinations for return mailpieces (step ST2 in FIG. 9). Table 2 illustrates exemplary POSTNET/PLANET code combinations for return mailpieces.

TABLE 2

POSTNET and PLANET Codes for Return Mailpieces

| POSTNET | PLANET | INDEX |
|---|---|---|
| 04921-2345-12 | 21-12345-6789 | 1 |
| 04921-2345-12 | 21-12345-6790 | 2 |
| 04921-2345-12 | 21-12345-6791 | 3 |

In Table 2, all of the POSTNET codes are the same, because the POSTNET code specifies the destination of the mailer, such as a billing center. Each of the PLANET codes includes the first two digits 21, which indicate that origin CONFIRM service is requested from the Postal Service. In addition, the remaining nine digits of each of the PLANET codes uniquely identifies a return mailpiece.

In step ST3, the mailer associates a mailpiece processing database entry with both sets of POSTNET/PLANET code combinations. That is, in FIG. 2, the database index for each POSTNET/PLANET code combination for a return mailpiece corresponds to the database index for the POSTNET/PLANET code combination for the outgoing mailpiece. Alternatively, both sets of POSTNET/PLANET code combinations may be stored in the same database entry when the mailpiece is created. Associating different mailpieces with the same database entry using POSTNET/PLANET code combinations is a unique feature of the present invention that allows multiple mailpieces to be associated with each other and tracked using the same database entry.

For example, in step ST4, the mailer may receive POSTNET/PLANET code combinations from mail stream devices, such as readers located in the mail stream United States Postal Service CONFIRM servers based on scan data from. In step ST5, the mailer may update mailpiece tracking information in the mailpiece processing database based on the information received from the United States Postal Service CONFIRM servers. In one example, an outgoing mailpiece having the POSTNET/PLANET code combination illustrated in Table 1 may be mailed. This mailpiece may be a bill. When the destination post office receives the bill, a reader at that post office will read this POSTNET/PLANET code combination, and store the location, date and time in the United States Postal Service CONFIRM server database, The mailer can then get access to the United States Postal Service CONFIRM server or it will forward that information to the mailpiece processing database application. The mailpiece processing database application will update an entry in the mailpiece processing database indicating that the mailpiece has been delivered.

When the customer returns payment for the bill, a reader at the post office that receives the mailpiece will read the POSTNET/PLANET code combination for the mailpiece. In this example, it is assumed that the POSTNET/PLANET code combination corresponds to the combination listed in row 1 of Table 2. The United States Postal Service CONFIRM server will recognize from the PLANET code that origin CONFIRM service is requested and will store the location, date and time in the United States Postal Service CONFIRM server database. The mailer can then access the United States Postal Service CONFIRM server and get access to the scan data. The mailer will then access the mailpiece processing database at the specified index and update tracking information in the same entry as the outgoing mailpiece for the return mailpiece.

Steps ST4 and ST5 in FIG. 9 are not limited to storing United States Postal Service destination and CONFIRM service information for multiple mailpieces in the same database entry. For example, the POSTNET and PLANET codes may be used to track both the outgoing and return mailpieces at any location in the mail stream, such as at intermediate postal service mail processing sites between the originating and destination post offices. In addition, the present invention is not limited to storing the mailpiece tracking information in the same database entry. All that is required for purposes of the present invention is that the tracking information for the outgoing mailpieces be associated with the tracking information for the return mailpieces. Such an association may be accomplished using a pointer in the database entry for either the outgoing mailpiece or the return mailpiece.

Late Pulling Using POSTNET/PLANET Code Combination

According to another aspect, the present invention includes a method for pulling mailpieces from the mailpiece processing stream using the POSTNET/PLANET code combination. Referring back to FIG. 3, a mailpiece travels through a variety of equipment including an inserting system 318 and a sorting system 320 before being delivered to the mail stream. In some instances, it may be desirable to prevent a mailpiece from entering the mail stream after mailpiece processing has begun for the mailpiece. For example, a mailpiece may be a service termination notice that is to be mailed to a customer in response to failure of the customer to pay a bill. If the customer pays the bill after mailpiece processing has begun for the service termination notice, it is desirable to extract the service termination notice from the mailpiece processing stream. According to the present invention, such extraction may be performed using the POSTNET/PLANET code combination.

The steps for performing late pulling using the POSTNET/PLANET code combination are an application of the generic concept of accessing mailpiece processing information using the POSTNET/PLANET code combination. Hence, description of this embodiment will be explained with regard to the steps illustrated in FIG. 6. Referring to FIG. 6, in step ST1, mailpiece processing database application 308 receives postal service mailpiece processing codes read from a mailpiece. In this example, the postal service mailpiece processing codes may be read from the mailpiece by a reader located at the inserter, the sorter, or any other location in the mailpiece processing stream. In steps ST2 and ST3, mailpiece processing database application 308 uses the POSTNET/PLANET code combination to access mailpiece processing information for the mailpiece. In this example, the mailpiece processing information may be an extraction command for instructing a mailpiece processing device to extract a mailpiece from the mail stream. Such an extraction command may be stored in mailpiece processing database 309 or in a file local to the particular mailpiece processing device, such as sorter 320 or inserting system 318. Once the mailpiece processing control software receives the command, the mailpiece processing control software performs the mailpiece processing task. In this example, the mailpiece processing task is extracting a mailpiece from the mail stream to prevent mailing to a customer. Thus, the present invention includes methods and systems for late pulling of mailpieces based on the POSTNET/PLANET code combination.

It will be understood that various details of the invention can be changed without departing from the scope of the invention. Furthermore, the foregoing description is for the purpose of illustration only, and not for the purpose of limitation—the invention being defined by the claims.

What is claimed is:

1. A method for controlling mailpiece processing using a postal service mailpiece code, the method comprising:

(a) receiving a postal service mailpiece code read from a mailpiece;

(b) extracting mailpiece processing information from a mailpiece processing database based on the postal service mailpiece code; and (c) using the mailpiece processing information to perform at least one mailpiece processing task on the mailpiece.

2. The method of claim 1 wherein extracting mailpiece processing information includes determining a database index based on the postal service mailpiece code and extracting the mailpiece processing data includes locating the mailpiece processing information in the mailpiece processing database using the database index.

3. The method of claim 2 wherein determining a database index includes performing a lookup in a translation file for translating the postal service mailpiece code to the database index.

4. The method of claim 1 wherein receiving a postal service mailpiece code includes receiving a postal service mailpiece code containing information specifying a destination for the mailpiece.

5. The method of claim 1 wherein receiving a postal service mailpiece code includes receiving a postal service mailpiece code containing information specifying a source of the mailpiece.

6. The method of claim 1 wherein receiving a postal service mailpiece code includes receiving a first postal service mailpiece code containing information for specifying the source of a mailpiece and a second postal service mailpiece code containing information for specifying the destination of a mailpiece and extracting the mailpiece processing information includes locating the mailpiece processing information in the mailpiece processing database using the first and second postal service mailpiece codes.

7. The method of claim 6 wherein locating the mailpiece processing information in the mailpiece processing database using the first and second postal service mailpiece codes includes searching the mailpiece processing database for a record containing the first and second postal service mailpiece codes.

8. The method of claim 6 wherein locating the mailpiece processing information using the first and second postal service mailpiece codes includes extracting the database index from a translation file using the first and second postal service mailpiece codes and locating the mailpiece processing information based on the index.

9. The method of claim 1 wherein receiving a postal service mailpiece code includes receiving a United States Postal Service PLANET code and extracting the mailpiece processing information includes extracting the mailpiece processing information based on the PLANET code.

10. The method of claim 1 wherein receiving a postal service mailpiece code includes receiving a United States Postal Service POSTNET code and extracting the mailpiece processing information includes extracting the mailpiece processing information based on the POSTNET code.

11. The method of claim 1 wherein receiving a postal service mailpiece code includes receiving a United States Postal Service POSTNET code and United States Postal Service PLANET code and extracting the mailpiece processing information includes extracting the mailpiece processing information based on the POSTNET and PLANET codes.

12. The method of claim 11 wherein extracting the mailpiece processing information based on the POSTNET and PLANET codes includes extracting an index from a translation file using the POSTNET and PLANET codes and extracting the mailpiece processing information from the mailpiece processing database includes extracting the mailpiece processing information using the index.

13. The method of claim 11 wherein extracting the mailpiece processing information using the POSTNET and PLANET codes includes performing a lookup in the mailpiece processing database for an entry containing the POSTNET and PLANET codes.

14. The method of claim 11 wherein extracting the mailpiece processing information based on the POSTNET and PLANET codes includes extracting the mailpiece processing information based on only the POSTNET and PLANET codes.

15. The method of claim 1 wherein using the mailpiece processing information to perform at least one mail processing task includes using the mailpiece processing information to control an inserter.

16. The method of claim 1 wherein using the mailpiece processing information to perform at least one mail processing task includes using the mailpiece processing information to control a sorter.

17. The method of claim 1 wherein postal service mailpiece code uniquely identifies the mailpiece.

18. A method for accessing mailpiece processing information using a postal service mailpiece code, the method comprising:

(a) receiving a United States Postal Service PLANET code and a United States Postal Service POSTNET code read from a mailpiece;

(b) extracting mailpiece processing information from a mailpiece processing database based on the PLANET and POSTNET codes; and (c) using the mailpiece processing information to perform at least one mailpiece processing task on the mailpiece.

19. A method for tracking a mailpiece during mailpiece processing and during transfer through a mail stream using a postal service mailpiece code, the method comprising:

(a) receiving, from a reader located at a predetermined location in a mailpiece processing stream, a postal service mailpiece code read from a mailpiece;

(b) locating an entry corresponding to the mailpiece in a mailpiece processing database using the postal service mailpiece code;

(c) updating mailpiece tracking information for the mailpiece in the entry based on the first predetermined location;

(d) receiving information originating from a mail stream device indicative of a location of the mailpiece in a mail stream, the information including the postal service mailpiece code;

(e) locating the entry corresponding to the mailpiece in the mailpiece processing database using the postal service mailpiece code; and (f) updating the mailpiece tracking information in the entry based on the information originating from the mail stream device.

20. The method of claim 19 wherein receiving a postal service mailpiece code from a reader located at a first predetermined location in a mailpiece processing stream includes receiving a postal service mailpiece code containing information specifying a destination for the mailpiece.

21. The method of claim 19 wherein receiving a postal service mailpiece code from a reader located at a first predetermined location in a mailpiece processing stream includes receiving a postal service mailpiece code containing information specifying a source for the mailpiece.

22. The method of claim 19 wherein receiving a postal service mailpiece code includes receiving a United States Postal Service PLANET code and locating the entry in steps (b) and (e) includes using the PLANET code.

23. The method of claim 19 wherein receiving a postal service mailpiece code includes receiving a United States Postal Service POSTNET code and locating the entry in steps (b) and (e) includes using the POSTNET code.

24. The method of claim 19 wherein receiving a postal service mailpiece code includes receiving a United States Postal Service PLANET code and United States Postal Service POSTNET code and locating the entry in steps (b) and (e) includes using the POSTNET and PLANET codes.

25. The method of claim 24 wherein locating an entry using the POSTNET and PLANET codes includes performing a lookup in the mailpiece processing database from an entry containing the POSTNET and PLANET codes.

26. The method of claim 24 wherein locating an entry using the POSTNET and PLANET codes includes extracting a database index from a translation file based on the POSTNET and PLANET codes and locating an entry based on the database index.

27. The method of claim 24 wherein locating an entry based on the PLANET and POSTNET codes includes extracting the mailpiece processing information based only on the PLANET and POSTNET codes.

28. The method of claim 19 wherein receiving a postal service mailpiece code from a reader located at a first predetermined location in a mailpiece processing stream includes receiving a single postal service mailpiece code including information uniquely identifying the mailpiece.

29. The method of claim 19 wherein receiving a postal service mailpiece code from a reader located at a first location in a mailpiece processing stream includes receiving a postal service mailpiece code from a reader associated with a mail inserter.

30. The method of claim 19 wherein receiving a postal service mailpiece code from a reader located at a first location in a mailpiece processing stream includes receiving a postal address code from a reader associated with a mail sorter.

31. The method of claim 19 wherein receiving information from a mail stream device includes receiving the information from a server operatively associated with a mail stream reader for reading the postal service mailpiece code from the mailpiece.

32. The method of claim 31 wherein receiving information from a server includes receiving the information from a CONFIRM server.

33. The method of claim 19 wherein receiving information from a mail stream device includes receiving information indicative of a location, date, and time at which the mailpiece was processed in the mail stream.

34. The method of claim 19 wherein receiving information from a mail stream device includes receiving information including a code indicative of a source of the mailpiece.

35. The method of claim 19 wherein receiving information from a mail stream device includes receiving information including a code indicative of a destination of the mailpiece.

36. The method of claim 19 wherein receiving information from a mail stream device information includes receiving information including a code indicative of a source of and destination for the mailpiece.

37. The method of claim 19 wherein receiving information from a mail stream device includes receiving the mailpiece tracking information including a United States Postal Service POSTNET code.

38. The method of claim 19 wherein receiving information from a mail stream device includes receiving the mailpiece tracking information including a United States Postal Service PLANET code.

39. The method of claim 19 wherein receiving information from a mail stream device includes receiving the mailpiece tracking information including a United States Postal Service POSTNET code and a United States Postal Service PLANET code.

40. A method for mailpiece sequencing using a postal service mailpiece code, the method comprising:

(a) receiving a postal service mailpiece code read from a mailpiece at a first location in a mailpiece processing stream;

(b) assigning a sequence number to the mailpiece based on the postal service mailpiece code;

(c) receiving a postal service mailpiece code read from the mailpiece at a second location in the mailpiece processing stream;

(d) determining whether a sequence number associated with the mailpiece equals the next expected sequence number; and (e) in response to determining that the sequence number associated with the mailpiece equals the next expected sequence number, processing the mailpiece as normal.

41. The method of claim 40 wherein assigning a sequence number to the mailpiece includes assigning a unique sequence number based on a United States Postal Service POSTNET code and PLANET code located on the mailpiece.

42. The method of claim 40 wherein assigning a sequence number to the mailpiece includes embedding the sequence number in a United States Postal Service PLANET code located on the mailpiece.

43. The method of claim 40 wherein determining whether the sequence number equals the next expected sequence number includes performing a lookup in a translation file based on the postal service mailpiece code for a sequence number and comparing the sequence number extracted from the translation file to the next expected sequence number.

44. A method for associating mailpiece tracking information for outgoing and return mailpieces using POSTNET and PLANET codes, the method comprising:

(a) generating a first unique POSTNET and PLANET code combination for an outgoing mailpiece;

(b) generating a second POSTNET and PLANET code combination for a return mailpiece associated with the outgoing mailpiece;

(c) associating a mailpiece processing database entry with the first and second POSTNET and PLANET code combinations;

(d) receiving information including a POSTNET and PLANET code combination from a mail stream device; and (e) updating mailpiece tracking information in the mailpiece processing database based on the information received from the mail stream device.

45. The method of claim 44 wherein receiving information from a mail stream device includes receiving origin CONFIRM information from a mail stream device.

46. The method of claim 44 wherein receiving information from a mail stream device includes receiving destination CONFIRM information from a mail stream device.

47. The method of claim 44 wherein receiving information read from a mail stream device includes receiving information from a mail processing site located between an origin and destination post office.

48. The method of claim 44 wherein updating mailpiece tracking information based on information received from the mail stream device includes storing information for both the outgoing and return mailpiece in the same database entry.

49. The method of claim 44 wherein updating mailpiece tracking information in the mailpiece processing database based on information received from a mailpiece device includes storing multiple instances of mailpiece tracking information for the outgoing and return mailpiece in the mailpiece processing database.

50. A method for extracting a mailpiece from a mailpiece processing stream using a postal service mailpiece code, the method comprising:

(a) reading, at a predetermined location in a mailpiece processing stream, a postal service mailpiece code located on a mailpiece;

(b) locating mailpiece processing information for the mailpiece based on the postal service mailpiece code; and (c) extracting the mailpiece from the mailpiece processing stream based on the mailpiece processing information.

51. The method of claim 50 wherein the postal service mailpiece code includes a United States Postal Service POSTNET code and a United States Postal Service PLANET code.

52. The method of claim 50 wherein the predetermined location in the mailpiece processing stream is at a mail sorter.

53. The method of claim 50 wherein the predetermined location in the mailpiece processing stream is at a mail inserter.

54. The method of claim 50 wherein locating the mailpiece processing information includes locating the mailpiece processing information in a mailpiece processing database.

55. The method of claim 50 wherein locating the mailpiece processing information includes locating the mailpiece processing information in a file local to a mailpiece processing device.

56. A computer program product comprising computer executable instructions embodied in a computer-readable medium for performing steps comprising:

(a) receiving a postal service mailpiece code read from a mailpiece;

(b) extracting mailpiece processing information from a mailpiece processing database based on the postal service mailpiece code; and (c) sending the mailpiece processing information to a mailpiece processing device for performing a mailpiece processing task on the mailpiece.

57. The computer program product of claim 56 wherein receiving a postal service mailpiece code includes receiving a United States Postal Service POSTNET code and a United States Postal service PLANET code read from the mailpiece.

58. The computer program product of claim 56 wherein receiving a postal service mailpiece code includes receiving a code for uniquely identifying the mailpiece.

59. The computer program product of claim 56 wherein sending the mailpiece processing information to a mailpiece processing device includes sending the mailpiece processing information to a mail inserter.

60. The computer program product of claim 56 wherein sending the mailpiece processing information to a mailpiece processing device includes sending the mailpiece processing information to a mail sorter.

61. The computer program product of claim 56 comprising:

(a) receiving mailpiece tracking information from a reader associated with the mailpiece processing stream, the information including the postal service mailpiece code;

(b) locating an entry for the mailpiece in the mailpiece processing database using the postal service mailpiece code; and (c) updating mailpiece tracking information in the entry using the mailpiece tracking information received from the reader.

62. The computer program product of claim 56 comprising:

(a) receiving mailpiece tracking information from a device located in the mail stream, the information including the postal service mailpiece code;

(b) locating an entry for the mailpiece in the mailpiece processing database using the postal service mailpiece code; and (c) updating mailpiece tracking information in the entry using the mailpiece tracking information received from the reader.

63. A system for processing and tracking mailpieces using a postal service mailpiece code, the system comprising:

(a) a mailpiece processing database including a plurality of entries, each entry including instructions for processing a mailpiece; and (b) a mailpiece processing database application for receiving a postal service mailpiece code, locating an entry for a mailpiece in the mailpiece processing database using the postal service mailpiece code, and for extracting mailpiece processing instructions for the mailpiece.

64. The system of claim 63 wherein the mailpiece processing database application is adapted to receive United States Postal Service POSTNET and PLANET codes and to process the POSTNET and PLANET codes to locate the entry.

65. The system of claim 63 wherein the mailpiece processing database contains instructions for controlling an inserter.

66. The system of claim 63 wherein the mailpiece processing database contains instructions for controlling a sorter.

67. A method for tracking a mailpiece during mailpiece processing and during transfer through a mail stream using a postal service mailpiece code before entering the mail stream, the method comprising:

(a) receiving, from a reader located at a first predetermined location in a mailpiece processing stream, a first postal service mailpiece code containing information for specifying the source for a mailpiece and a second postal service mailpiece code containing information for specifying the destination for a mailpiece;

(b) locating an entry corresponding to the mailpiece in a mailpiece processing database using the postal service mailpiece code;

(c) updating mailpiece tracking information for the mailpiece in the entry based on the first predetermined location;

(d) receiving information originating from a mail stream device indicative of a location of the mailpiece in a mail stream, the information including the postal service mailpiece code;

(e) locating the entry corresponding to the mailpiece in the mailpiece processing database using the postal service mailpiece code; and (f) updating the mailpiece tracking information in the entry based on the information originating from the mail stream device.

68. The method of claim 67 wherein locating an entry corresponding to the mailpiece in the mailpiece processing database includes using the first and second codes to extract a database index from a translation file and locating the mailpiece processing information based on the index.

69. The method of claim 67 wherein locating an entry corresponding to the mailpiece in the mailpiece processing database includes performing a lookup in the mailpiece processing database for an entry containing the first and second codes.

70. A method for combining postal service mailpiece codes to uniquely identify a mailpiece and to control tracking and processing of the mailpiece, the method comprising:

(a) creating a mailpiece including a first postal service mailpiece code used by a postal service for identifying a source of the mailpiece and a second postal service mailpiece code used by a postal service for identifying a destination of the mailpiece; and (b) using the first and second mailpiece codes in combination as a unique identifier for the mailpiece; and (c) using the unique identifier to control pre-mail-stream mailpiece processing and tracking of the mailpiece in the mail stream.

71. The method of claim 70 wherein the first postal service mailpiece code comprises a PLANET code and the second postal service mailpiece code comprises a POSTNET code.

* * * * *